United States Patent [19]

Alnafissa

[11] Patent Number: 4,802,302
[45] Date of Patent: Feb. 7, 1989

[54] INSECT TRAPPING PET FOOD DISH

[76] Inventor: Fahad A. Alnafissa, 2407 Wilshire Blvd., Suite 4, Santa Monica, Calif. 90403

[21] Appl. No.: 116,529

[22] Filed: Nov. 3, 1987

[51] Int. Cl.$^4$ .............................................. A01M 1/14
[52] U.S. Cl. ......................................... 43/114; 43/121
[58] Field of Search ................. 43/108, 114, 116, 120, 43/121, 132.1, 136; 119/61, 96

[56] References Cited

U.S. PATENT DOCUMENTS

| | | | |
|---|---|---|---|
| 2,143,043 | 1/1939 | Wexler | 43/108 |
| 2,677,350 | 5/1954 | Prestidge et al. | 119/61 |
| 2,911,756 | 11/1959 | Geary | 43/114 |
| 3,195,510 | 7/1965 | Bernstein | 43/114 |
| 3,455,280 | 7/1969 | Keene | 119/61 |
| 3,527,192 | 9/1970 | Ferrara | 119/61 |
| 3,816,956 | 6/1974 | Sekula | 43/114 |
| 3,991,719 | 11/1976 | Bruce | 119/61 |
| 4,270,490 | 6/1981 | Kopp | 119/61 |
| 4,357,905 | 11/1982 | Carpenter | 119/61 |

Primary Examiner—M. Jordan
Attorney, Agent, or Firm—William L. Chapin

[57] ABSTRACT

A pet food dish effective in frustrating crawling insects from reaching food contained in the dish includes a cylindrical base section for resting on a support surface, and a concave-convex dish section which fits downward into a concave opening in the upper end of the cylindrical base section. The dish section has a downwardly depending annular flange which concentrically overlies the upper cylindrical wall of the base section, thus cooperating with the base section to produce a tortuous path for crawling insects attempting to travel from the support surface to food in the dish. In a preferred embodiment, disposable flexible strips coated on the outer surface with sticky insect-trapping adhesive is fastened circumferentially around the outer cylindrical wall of the cylindrical base section, the annular dish flange overlying the strip and preventing accidental contact with the adhesive. A scent attractant may be included in the adhesive coating to lure and trap flying as well as crawling insects.

12 Claims, 2 Drawing Sheets

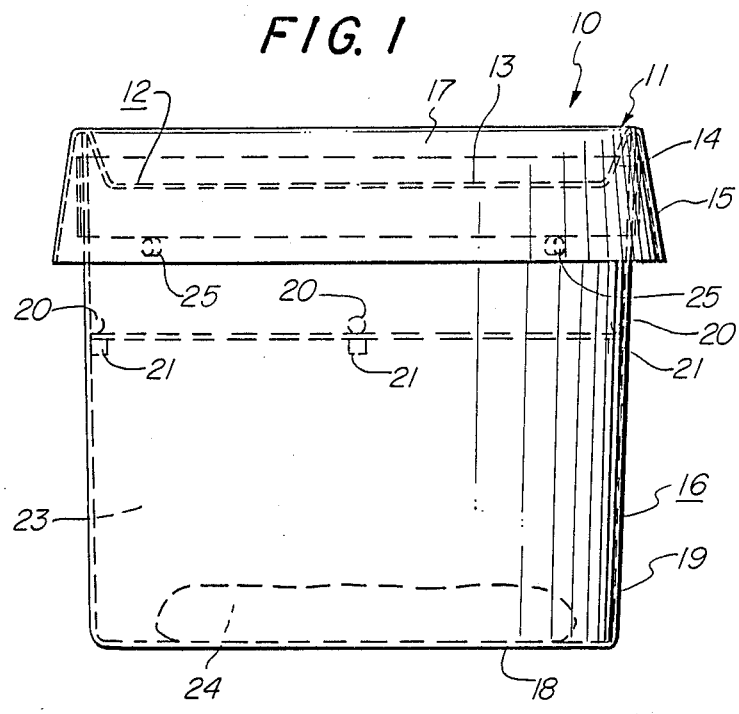
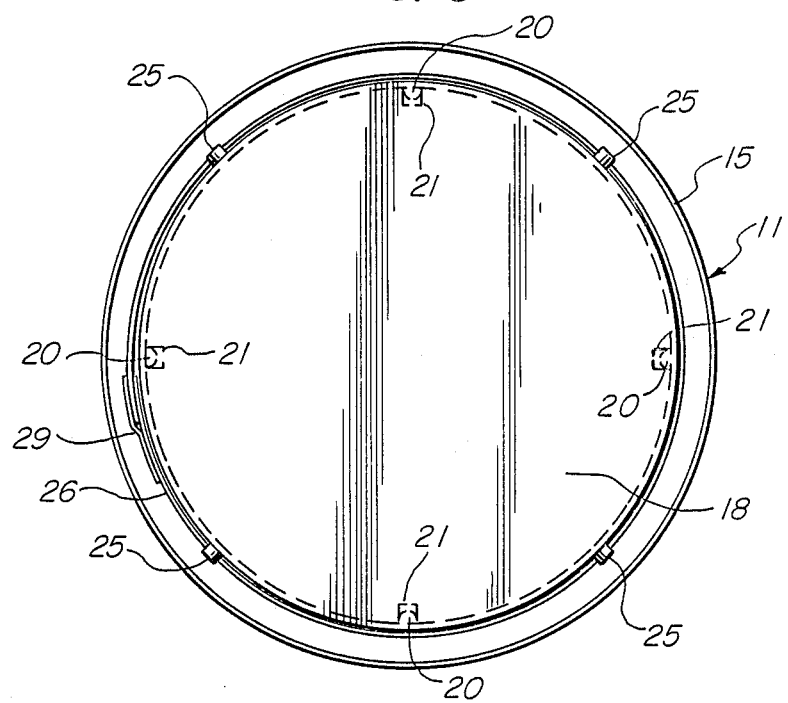

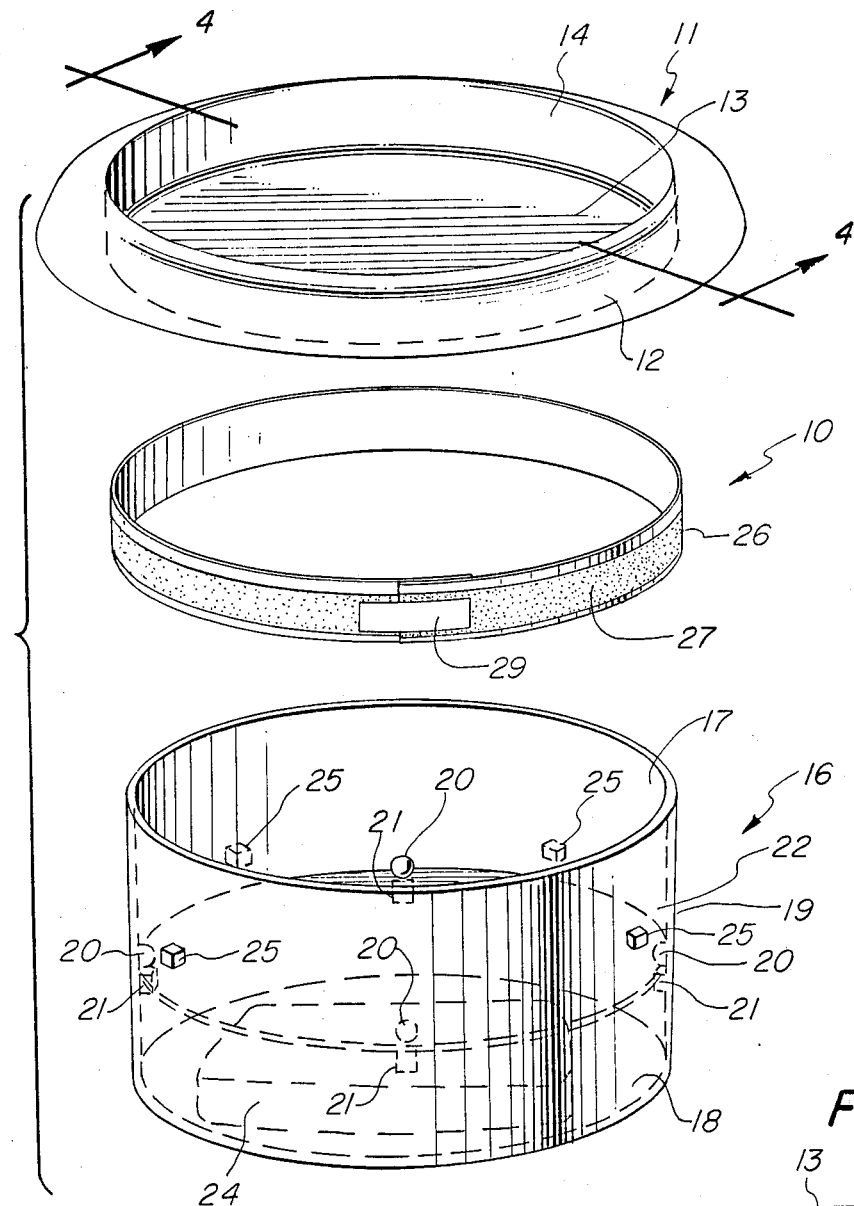
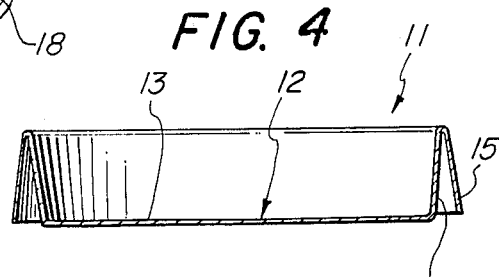
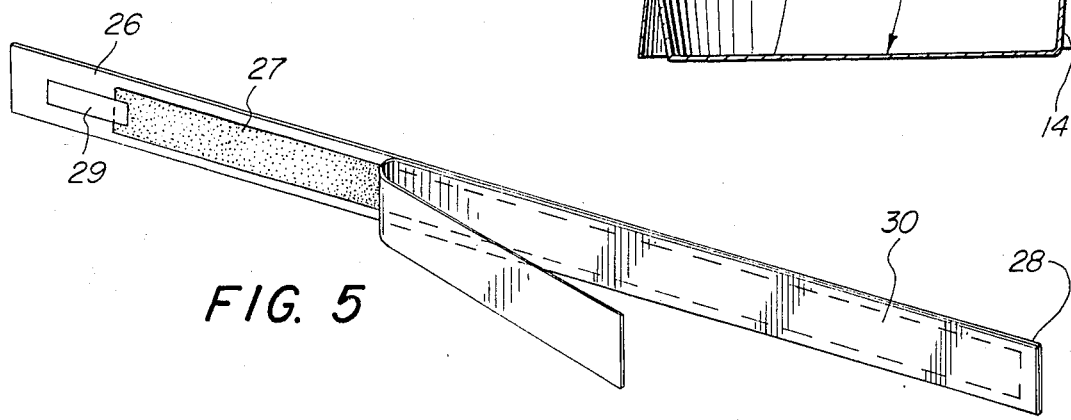

INSECT TRAPPING PET FOOD DISH

BACKGROUND OF THE INVENTION

A. Field of the Invention.

The present invention relates to food dishes for pets. More particularly, the invention relates to pet food dishes incorporating means for inhibiting insects from contacting food contained in the dish.

B. Discussion of Background Art.

Many people feed their pets, such as cats and dogs, outdoors. This is sometimes done as a matter of course, or occasionally, as when one has a neighbor come into the backyard to feed the family dog or cat while the animal's master is away.

Unfortunately, food in pet dishes placed outdoors attracts flying and crawling insects such as house flies, ants and roaches Aside from constituting an irritant to the more fastidious pets, insects attracted to the animal's food dish can transmit diseases, both to the animal and even to humans. Accordingly, it would be desirable to minimize the number of insects which are able to contact food in a pet's dish.

Examples of prior art of devices intended to support food dishes and having integral insect-trapping means include U.S. Pat. No. 52,576, issued Feb. 13, 1866 to Lamb for a Dish Stand having a coaxial water cup to trap ants and other insects U.S. Pat. No. 133,763, issued Dec. 10, 1872 to Curtis for Insect Traps discloses a support for food articles having a basin for water and other liquids coaxially mounted on a standard between a base and top piece, the liquid preventing vermin from reaching food articles on the top piece.

Examples of insect traps not incorporated into food dishes include the following U.S. patents: Matthews, 552,644, Jan. 7, 1896, Insect Trap; Rothweiler, 713,803, Nov. 18, 1902, Insect Trap, Mishimura, 4,044,495, Aug. 30, 1977; Device for Capturing Cockroaches; Hall, 4,208,828, June 24, 1980, Roach Trap; Carlsen, 4,316,344, Feb. 23, 1982, Roach Trap.

The present invention was conceived of to provide a pet food dish having integral insect-trapping means and a design maximizing its usefulness to the pet owner.

OBJECTS OF THE INVENTION

An object of the present invention is to provide a dish for pet food having integral insect-trapping means.

Another object of the invention is to provide a pet food dish having an insect-trapping device which is removable, disposable, and replaceable after having accumulated trapped insects.

Another object of the invention is to provide an insect-trapping pet food dish which is readily disassembled for cleaning.

Another object of the invention is to provide an insect-trapping pet food dish which resists tipping, thereby preventing spilling of pet food or decreasing the efficiency of the insect-trapping function.

Another object of the invention is to provide an insect-trapping pet food dish which includes a lure for insects.

Various other objects and advantages of the present invention, and its most novel features, will be particularly pointed out hereinafter in connection with the appended claims.

It is to be understood that although the invention disclosed herein is fully capable of achieving the objects and providing the advantages mentioned, the structural and operational characteristics of the invention described herein are merely illustrative of the preferred embodiments. Accordingly, I do not intend that the scope of my exclusive rights and privileges in the invention be limited to the details of construction and operation described. I do intend that equivalents, adaptations and modifications which may be reasonably construed to employ the novel concepts of the invention described herein be included within the scope of the invention as defined by the appended claims.

SUMMARY OF THE INVENTION

Briefly stated, the present invention comprehends a novel dish for pet food which incorporates highly effective means for trapping insects, thereby preventing their contact with food in the dish. The novel insect-trapping pet food dish according to the present invention includes an upper, circular cross-section concave dish portion, insertable into the upper opening of a hollow cylindrical base portion. Disposable paper rings coated on their outer surface with insect-trapping adhesive, with or without an insect-luring scent, are fastenable around the outer circumference of the upper part of the base section Weights may be placed inside the hollow base section to maintain the dish in an upright position.

BRIEF DESCRIPTION OF THE DRAWINGS

FIG. 1 is a front elevation view of an insect trapping pet food dish according to the present invention.

FIG. 2 is an exploded perspective view of the

FIG. 3 is a bottom plan view of the pet dish of FIG. 1.

FIG. 4 is a sectional view of the upper dish portion of the article of FIG. 1, taken along line 4—4.

FIG. 5 is a perspective view of a disposable insect-trapping sheet forming part of the article of FIG. 1.

DETAILED DESCRIPTION OF THE INVENTION

Referring now to FIGS. 1 through 5 and especially FIGS. 1 and 2, an insect-trapping pet dish 10 is shown to include an upper dish section 11 having a concave, circularly symmetric bowl-shaped body 12. As may be seen best by referring to FIG. 3, the dish section 11 has a generally uniform thickness disc-shaped base section 13, and an upwardly flared, annular side wall flange 14 which curves smoothly and upwardly from the base section. The dish section 11 includes an outer annular flange section 15 which curves smoothly and downwardly from the upper annular edge of the side wall flange 14.

Referring again to FIGS. 1 and 2, the insect-trapping dish 10 is seen to include a hollow cylindrical base section 16 having a circular upper opening 17 of the proper size to insertably and snugly receive the bowl-shaped body 12 of the upper dish section 11. The base section 16 has a disc-shaped base 18 joined to the cylindrical side walls 19 of the base section.

As shown in the Figures, both upper dish section 11 and base section 16 are fabricated from a thin-wall material. Thus, either or both upper dish section 11 and base section 16 could be fabricated from metal sheet stock, as by spinning or deep drawing. Preferably, both upper dish section 11 and base section 16 are fabricated from a thermoplastic material such as polyethylene or polypropylene. They may be fabricated from such thermoplastic materials by injection molding, blow molding, or vacuum forming.

As shown in FIGS. 1 and 2, the base section 16 includes pairs of upper and lower inwardly projecting bosses 20 and 21, respectively. Bosses 20 and 21 are spaced at regular circumferential intervals around the inner cylindrical wall of the base section 16, at a vertical distance approximately midway between one top and bottom of the base section. Preferably, four pairs of bosses 20 and 21 spaced at 90 degree intervals are used, as shown in FIGS. 1 and 2.

The function of bosses 20 and 21 is to hold in place a flexible disc-shaped lid 22 between the bosses. The cylindrical space 23 between lid 22 and the disc-shaped base 18 of base section 16 may be used to place weights such as a sandbag 24 to hold the pets feeding from the dish.

As shown in FIGS. 1 and 2, the base section 16 of pet food dish 10 includes several small lugs or bosses 25 circumferentially spaced apart and projecting radially outwards from the outer surface of the cylindrical side wall 19 of the base section a uniform distance below the top edge of the base section. Lugs 25 are included to form a stop for ring-shaped insect-trapping bands 26, which will now be described.

Referring now to FIGS. 1 and 2, the pet food dish 10 is seen to include an insect-trapping ring 26 made of a strip of specially treated paper cut into a uniform width strip and joined at opposite longitudinal edges of the strip to form a ring of the proper diameter to fit snugly around the outer surface of the cylindrical wall section 19 of base section 16.

As may be seen best by referring to FIG. 5, the disposable insect-trapping ring or band 26 is supplied in the shape of a rectangular strip of paper, the upper surface of which is coated with a layer 27 of insect-trapping adhesive such as the type commonly used to coat fly paper, and well known in the art. The adhesive layer may also incorporate an insect luring scent, if desired.

As shown in FIG. 5, each insect-trapping band 26 is fastened to a somewhat larger backing strip 28, made of a smooth paper or similar material which does not adhere well to the adhesive of which layer 27 is made, or to other adhesives. The insect-trapping band 26 may be conveniently fastened to the backing strip 28 by a strip of adhesive tape 29. The adhesive layer 27 is protected by an overlying fronting strip 30 similar in size, composition and function to backing strip 28.

The disposable insect-trapping band 26 is used as follows First, the backing strip 28 is peeled off the insect trapping band 26, which is then placed circumferentially around the upper portion of the cylindrical wall 19 of base section 18, with the lower longitudinal edge 31 of the fronting strip 30 resting on the lugs 25 projecting radially outwards from the cylindrical side wall. The adhesive tape strip 29 is then used to fasten adjacent, opposite lateral edges 32 of the band 26. Fronting strip 30 is then peeled off the band 26, exposing the adhesive, insect-trapping layer 27 on the upper surface of the band. Projecting lugs 25 encountering the lower longitudinal edge 33 of the band 26 prevent it from slipping further down the outer cylindrical walls lower than the lugs.

After a disposable insect-trapping band 26 has been attached to the outer circumference of the upper portion of base section 16 as described above, the upper dish section 11 of the insect-trapping pet food dish 10 is inserted into the upper opening 17 of the base section.

As shown in FIG. 1, with the dish section 11 inserted into the base section 16 as described above, the downwardly curving flanged side wall 15 of the dish section circumferentially overlies the sticky, insect-trapping layer 27 on the insect-trapping band 26. So positioned, the flanged side wall 15 prevents an animal feeding from the dish from contacting the insect-trapping layer.

When the insect-trapping layer 27 of an insect-trapping band 26 has become sufficiently full of insects, or when the effectiveness of the adhesive or attractional characteristic of the lay have degraded with time, the dish 11 may be removed from the base section 16, permitting easy removal, disposal, and replacement of the used insect-trapping band with a new one. Thus, the novel insect-trapping pet food dish according to the present invention provides a highly effective means for trapping crawling insects which might be attracted to food smells in a pet's food dish and a means for attracting and trapping flying insects attracted to the food. Moreover, the novel insect-trapping pet food dish according to the present invention provides a convenient disposable and renewable means for trapping insects, and disposing of same.

It is possible also to simplify the insect-trapping band shown in FIG. 5 by using regular tapes like those used for papers or electrical wires. The user can cut a piece of such tape and place it as a ring around the upper portion of the cylindrical wall 19 of base section 18; positioning the adhesive face of the piece of the tape toward the outside and adhering one end of the tape to the other end. To remove the ring, the user can insert a knife between the wall 19 and the piece of the tape and cut it out.

What is claimed is:
1. An insect-diverting pet food dish comprising
   a. a cylindrical base section having an upper cylindrical wall section adapted to receive an encircling band having an insect trapping outer layer,
   b. a dish section having a concave upper wall surface and a convex lower wall surface supportable on said base section, said concave dish section having a downwardly depending annular flange adapted to concentrically overlie said upper cylindrical wall section of said base section, and
   c. means for limiting downward slippability of an insect-trapping band fastened circumferentially around the outer cylindrical wall of said cylindrical base section.

2. The article of claim 1 wherein said cylindrical base section and said concave dish section are removably fastenable to one another.

3. The article of claim 2 wherein said cylindrical base section includes an upper opening adapted to insertably receive the lower convex wall section of said dish section.

4. The article of claim 3 wherein the lower surface of said downwardly depending annular flange section of said dish section is adapted to limit downward insertability of said dish section into said cylindrical base section.

5. The article of claim 1 wherein said means for limiting downward slippability of an insect-trapping band fastened circumferentially around the outer cylindrical wall of said cylindrical base section comprises a plurality of circumferentially spaced apart lugs projecting radially outwards from the outer cylindrical wall of said cylindrical base section, said lugs being located a uniform distance downwards from the upper edge of said cylindrical base section.

6. The article of claim 5 further including a lid adapted to fit concentrically within the inner circumferential surface of said cylindrical base section, and means for supporting said lid at a height intermediate the bottom and top of said base section, thereby defining a closed weight storage space between the lid and inside said cylindrical base section.

7. The article of claim 6 wherein said means for supporting said lid at said height comprises a plurality of circumferentially spaced apart bosses projecting radially inwards from
the inner cylindrical wall of said cylindrical base section, said bosses being located a uniform distance upwards from the base of said base section.

8. An insect-diverting pet food dish comprising:
a. a generally circularly symmetric dish section having a concave upper wall surface, a convex lower wall surface, and an annular flange section depending downwards from the outer circumferential edge of said concave upper wall section forming an annular channel in the lower surface of said dish section,
b. a hollow cylindrical base section having an upper opening adapted to insertably receive the lower convex wall section of said dish section, downward movement of said dish section into said hollow cylindrical base section being limited by contact between the upper wall surface of said base section with said annular channel of said dish section,
c. insect trapping means comprising an elongated sheet of flexible material having a sticky, insect-trapping surface, said elongated sheet being of the proper length to form a continuous band fastenable around said cylindrical base section at a height intermediate the top and bottom of said cylindrical base section, and said strip concentrically underlying said annular flange section, and
d. means for limiting downward movement of said sticky coating strip to a point no lower than the lower circumferential edge of said annular flange.

9. The article of claim 8 wherein said means for limiting downward movement of said sticky coating strip comprises a plurality of circumferentially spaced apart lugs projecting radially outwards from the outer cylindrical wall of said base section, said lugs being located a uniform distance upwards from the bottom surface of said base section.

10. The article of claim 9 wherein said hollow cylindrical base section includes a bottom wall section forming a closed cylinder open at the top.

11. The article of claim 10 further including a lid adapted to fit concentrically within the inner circumferential surface of said hollow cylindrical base section, and means for supporting said lid at a height intermediate the bottom and top of said base section, said means comprising a plurality of circumferentially spaced apart lower bosses projecting radially inwards from the inner wall surface of said hollow cylindrical base section, said bosses being located a uniform distance upwards from the bottom of said base section.

12. The article of claim 11 further including means for limiting upward movement of said lid, said means comprising a plurality of upper bosses, one above and vertically aligned with each of said lower bosses.

* * * * *